United States Patent [19]

Gellert

[11] Patent Number: 4,579,520
[45] Date of Patent: Apr. 1, 1986

[54] INJECTION MOLDING VALVE GATED SYSTEM

[76] Inventor: Jobst U. Gellert, 7A Prince Street, Georgetown, Ontario, Canada, L7G 2X1

[21] Appl. No.: 585,835

[22] Filed: Mar. 2, 1984

[30] Foreign Application Priority Data

Feb. 17, 1984 [CA] Canada .................................. 447741

[51] Int. Cl.⁴ ............................................. B29C 45/22
[52] U.S. Cl. ...................... 425/549; 264/39; 425/566; 425/DIG. 227
[58] Field of Search ..... 425/564, 566, 571, DIG. 224, 425/DIG. 227, 549, 190; 29/157 C, 157 R; 222/572; 264/39

[56] References Cited

U.S. PATENT DOCUMENTS

| | | | |
|---|---|---|---|
| 3,076,225 | 2/1963 | Sherbondy | 425/190 |
| 3,211,347 | 10/1965 | Phillips, Jr. | 222/572 |
| 4,026,518 | 5/1977 | Gellert | 425/242 R |
| 4,043,740 | 8/1977 | Gellert | 425/567 |
| 4,286,941 | 9/1981 | Gellert | 425/566 |
| 4,449,915 | 5/1984 | van den Brink | 425/564 |
| 4,468,191 | 8/1984 | Gellert | 425/564 |

FOREIGN PATENT DOCUMENTS

1165525 4/1984 Canada .

OTHER PUBLICATIONS

Mold-Masters ® Melt Conveying Tech with Master-Shot ® Nozzles-Company Magazine.

Primary Examiner—Jay H. Woo
Assistant Examiner—Timothy W. Heitbrink
Attorney, Agent, or Firm—Riches, McKenzie & Herbert

[57] ABSTRACT

This invention relates to an improved valve gated injection molding system in which the heated nozzle has a nose portion which extends through a cylindrical opening in the cavity plate to the cavity. The valve gate extends through the nose portion and is tapered so that the forward face of the nose portion can be machined to a predetermined length to provide a gate of a particular size. This has the advantage of improving heat transfer to the gate area and reducing the accuracy required of the moldmaker in that both the valve pin and the matching seat in the gate are provided by the manufacturer. Furthermore, each size of nozzle can be adapted for several different gate sizes which reduces manufacturing and inventory costs.

4 Claims, 3 Drawing Figures

INJECTION MOLDING VALVE GATED SYSTEM

BACKGROUND OF THE INVENTION

This invention relates to valve gated injection molding and more particularly to an improved system in which the heated nozzle has a nose portion which extends through an opening in the cavity plate directly to the cavity and itself forms the gate in which the tip end of the valve pin seats to control the flow of melt to the cavity.

As is well known in the art, this type of injection molding sytem has an insulative air space extending between the heated nozzle and the cooled cavity plate. In many early applications, this space was allowed to fill with melt which partially solidified and acted as an insulator. However, this has the disadvantage that it is difficult, if not impossible, to clear the previous material on colour and/or material changes, and furthermore for some materials additional heat is required in the gate area to ensure satisfactory seating of the valve pin in the gate.

Thus, in order to overcome these problems, the applicant provided a hollow cylindrical nozzle seal formed of titanium as described in the applicant's U.S. Pat. No. 4,043,740 which issued Aug. 23, 1977. This seal is seated in both the nozzle and cavity plate to bridge the air space around the gate. More recently, as described in the applicant's U.S. Pat. No. 4,286,941 which issued Sept. 1, 1981, a titanium nozzle seal has been provided which extends through an opening in the cavity plate right into the cavity to provide even more heat in the gate area adjacent the cavity. While these previous systems have been very successful, they have the disadvantages that a particular unit has to be used for a particular gate size and the moldmaker has to be very precise in making the gate the correct size and the correct angle.

In a more recent application relating to a different aspect of sprue gating, the applicant discloses in Canadian patent application Ser. No. 370,734 filed Feb. 12, 1981 entitled "Heated Nozzle Bushing with Fixed Spiral Blade", a heated nozzle or nozzle bushing with a portion which extends through the cavity plate to the cavity. However, this structure was necessary to extend the spiral blade right to the cavity, and there is no suggestion it could be transposed to a valve gated system requiring a gate to seat the valve pin in.

SUMMARY OF THE INVENTION

Accordingly, it is an object of the present invention to at least partially overcome the disadvantages of the prior art by providing a valve gated system in which the heated nozzle has a nose portion which is received in an opening in the cavity plate which is easy to make. In one of its aspects, the nozzle can be adapted for a particular gate size by machining off a portion of the nose portion.

To this end, in one of its aspects, the invention provides a valve gated injection molding system having a heated nozzle seated in a cooled cavity plate, an elongated valve pin which reciprocates in the heated nozzle between open and closed positions, a melt passage which extends through a bore in the heated nozzle around the valve pin and conveys hot pressurized melt from a molding machine to a gate leading to a cavity which is partially defined on one side by a face of the cavity plate, the valve pin having a driven end and a tip end which seats in the gate in the closed position, and valve pin actuating mechanism which engages the driven end of the valve pin to drive it between the open and closed positions, including the improvement wherein the heated nozzle has a nose portion with a forward face, the nose portion being tightly seated in an opening in the cavity plate to the cavity, the nose portion extending through the opening to a position wherein the forward face of the nozzle portion is in substantial alignment with said face of the cavity plate to define said one side of the cavity, the nose portion having the gate therein extending from the bore to the cavity.

In another of its aspects, the nose portion of the heated nozzle is formed with at least a portion of the gate tapered to decrease in size away from the bore, whereby a predetermined portion of the nose portion may be machined off prior to assembly to increase the minimum size of the gate at the forward face of the nose portion to a particular cross-sectional area and to reduce the length of the nose portion.

Further objects and advantages of the invention will appear from the following description taken together with the accompanying drawings.

DESCRIPTION OF THE PREFERRED EMBODIMENTS

Figure 1:
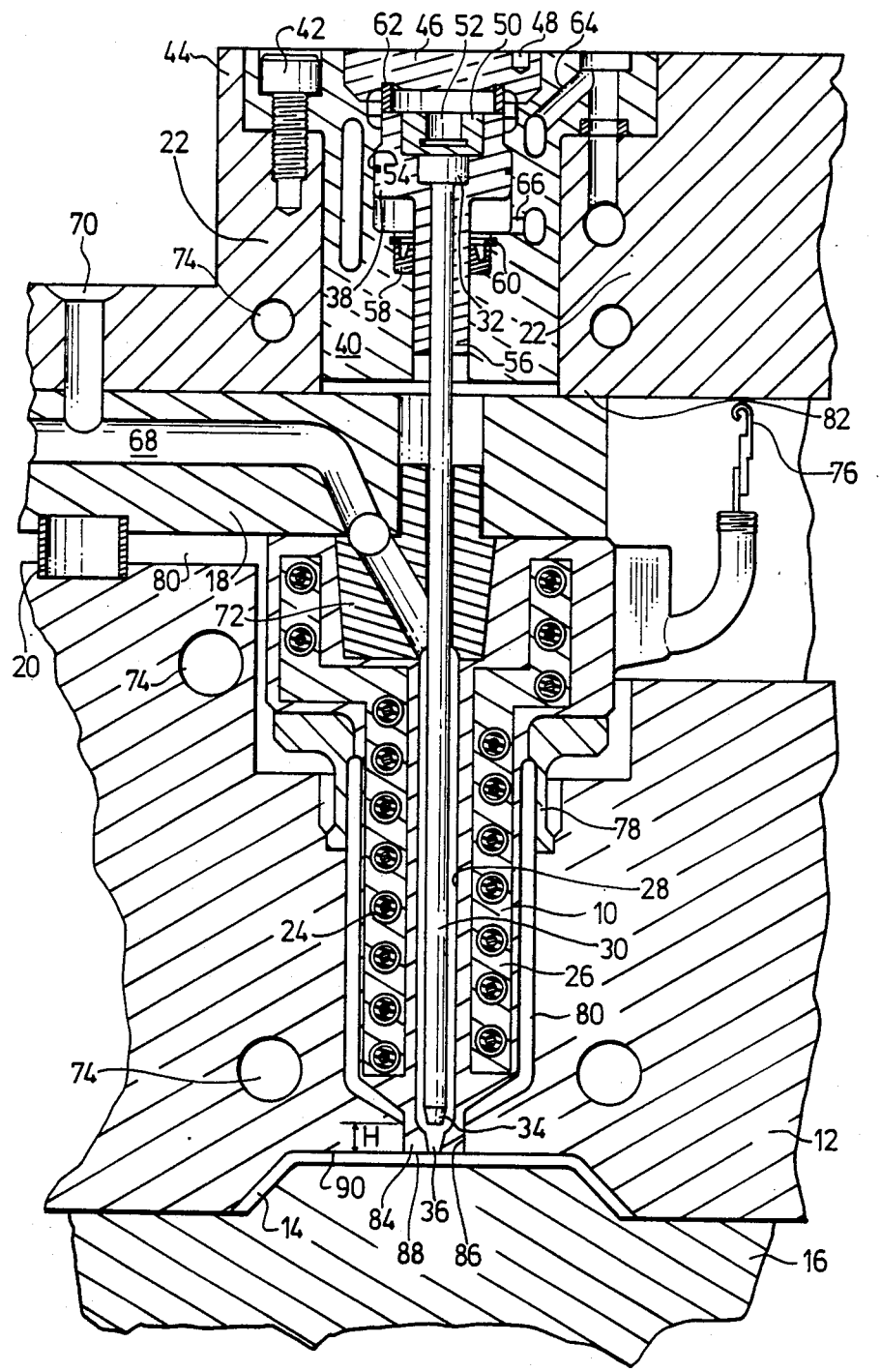
FIG. 1 is a sectional view of a portion of a valve gated injection molding system according to a preferred embodiment of the invention.

Reference is first made to FIG. 1 which shows one heated nozzle 10 of a multi-cavity hydraulically actuated valve gated injection molding system seated in a steel cavity plate 12 with a cavity 14 extending between the cavity plate 12 and a movable mold platen 16. A manifold 18 positioned by locating ring 20 extends between the heated nozzle 10 and cavity plate 12 and a back plate 22. The heated nozzle 10 is formed generally of a corrosion and abrasion resistant metal such as steel, but has an electric heating element 24 cast into an inner portion 26 formed of a highly thermally conductive metal such as copper to more rapidly disperse the heat to the steel. The heated nozzle 10 has a central bore 28 which receives an elongated valve pin 30 having a driven end 32 and a tip end 34. The driven end 32 of the valve pin 30 is engaged by hydraulically driven actuating mechanism which is seated in the back plate 22 and reciprocates the valve pin longitudinally between the open position shown and a closed position in which the tip end 34 is seated in a gate 36 leading to the cavity 14.

The actuating mechanism includes a piston 38 which reciprocates in a cylinder 40 seated in a bore in the back plate 22. The cylinder 40 is secured in position by bolts 42 extending through a flanged portion 44. The cylinder is sealed by a cap 46 which is screwed into the cylinder 40 and tightened by a forked wrench (not shown) which has pins that fit into the small holes 48 in the top of the cap 46. The valve pin 30 extends through a hole in the piston 38 and is secured to it by a plug 50 which is tightened against the driven end 32 of the piston by inserting a hexagonal wrench (not shown) into a socket 52. The piston 38 has an O-ring 54 which provides a seal between it and the cylinder, and a high temperature seal is provided around the neck 56 of the piston 38 by a V-shaped flexible ring 58 which is held in position by an expansion washer 60 seated in a groove. An abutment sleeve 62 is located between the piston 38 and the cap 46 so that the extent of travel of the piston 38 and the valve pin 30 in the open position can be adjusted by changing the height of the abutment sleeve 62. As described in more detail in the applicant's U.S. patent application Ser. No. 485,024 filed Apr. 14, 1983 entitled "Hydraulically Actuated Injection Molding System with Alternate Hydraulic Connections", the piston is driven according to a predetermined cycle by the application of pressurized hydraulic fluid through ducts 64,66 leading to the cylinder 40 on opposite sides of the piston 38.

A melt passage 68 branches out from a recessed inlet 70 through the manifold 18 and extends around the valve pin 30 through the bore 28 in the heated nozzle 10 to the gate 36. The melt passage 68 joins the bore 28 in a stainless steel bushing seal 72 which is seated in the nozzle 10. As described in the applicant's U.S. Pat. No. 4,026,518 which issued May 31, 1977, the bushing seal prevents leakage of the pressurized melt along the reciprocating valve pin 30.

The cavity plate 12 and back plate 22 are cooled in a conventional manner by cooling channels 74. As described above, the nozzle 10 is heated by the insulated electrical element 24 which is cast into it and receives power through terminals 76 (only one shown) to maintain the melt flowing through the melt passage 68 within the necessary temperature range. The heated nozzle 10 is seated in the cavity plate 12 on an insulation bushing 78 which provides an insulative air space 80 between the hot nozzle and the cool cavity plate. Similarly, the locating ring 20 separates the hot manifold 18 from the cool cavity plate to ensure the insulative air space 80 continues between them. As may be seen, a second insulative air space 82 extends between the cool back plate 22 and the hot manifold 18.

As mentioned above, in the past, the gate to the cavity has extended through the cavity plate itself and the air space 80 between the heated nozzle 10 and the cavity plate 12 has been bridged by a cylindrical titanium nozzle seal extending around the gate. As may be seen, according to the present invention, the heated nozzle 10 has a cylindrical shaped nose portion 84 through which the gate 36 extends to the cavity 14. The nose portion 84 is securely seated in a cylindrical opening 86 through the cavity plate 12 and has a forward face 88 which, at working temperature, is in alignment with the face 90 of the cavity plate 12 which partially defines the cavity 14. In addition to sealing off the air space 80 from the pressurized melt, this arrangment has the advantage for critical temperature materials such as polyester and also very high and sharp melting point materials that a more uniform temperature is provided right into the cavity. In other words, improved heat transfer is provided to the gate area and it is not necessary to overheat the melt in the area of the heating element 24 to avoid too low a temperature adjacent the cavity. As compared with the great majority of polymers which have a gradual softening curve, there is a variety of heat and shear sensitive polymers with high and sharp melting points where it is desirable to have a gate temperature that is somewhat below the melting point of the polymer, without the temperature of the melt at any other point in the system rising to more than about 20° C. above its melting point. For these mostly crystalline polymers, a simple means of adjusting gate temperature without separate heating means is important.

Figure 2:
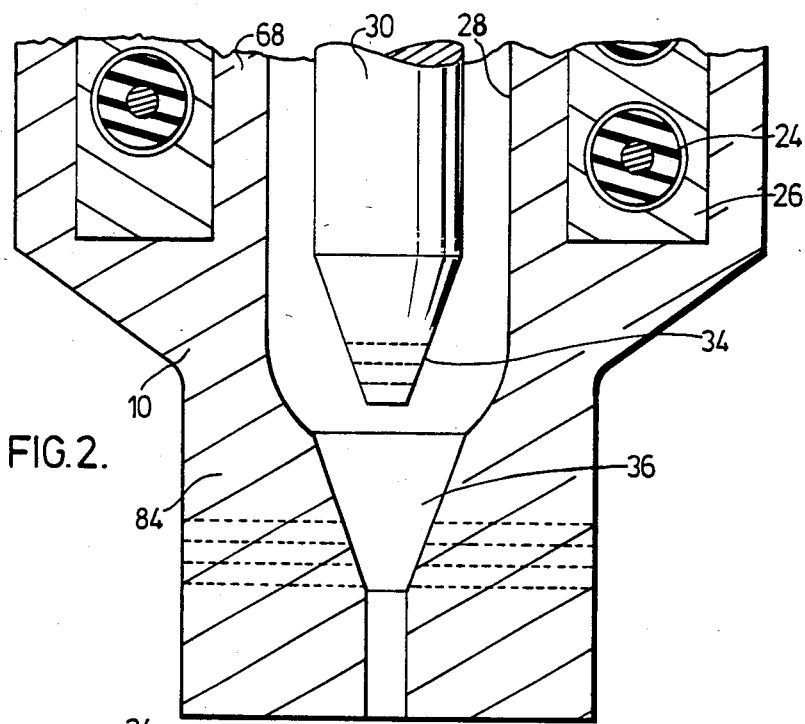
FIG. 2 is a sectional view of a portion of the heated nozzle shown in FIG. 1 prior to the nose portion being machined.

In addition, as will now be described with particular reference to FIG. 2, this structure enables the nozzle manufacturer to supply a single size of nozzle which may be readily adapted by the customer's moldmaker to the necessary gate size for a particular application. FIG. 2 shows the nose portion 84 and the valve pin tip end 34 as they are supplied by the manufacturer prior to installation. The moldmaker then machines the nose portion to a particular length corresponding to one of the dotted lines shown in FIG. 2 which provides the gate with a selected minimum size at the forward face 88 due to the fact that the gate 36 is tapered in the area. The manufacturer provides the moldmaker with a chart showing the nozzle length to which the nose portion must be machined to provide minimum gate diameters of say 1.5 mm, 2.0 mm, 2.5 mm or 3.0 mm. Of course, the tip end 34 of the valve pin 30 must similarly be machined to a selected length to correspond to the minimum gate diameter as indicated by the dotted lines in FIG. 2. The tip end 34 of the valve pin 30 is tapered to match the taper of the gate 36 to provide a tight seal in the closed position. As will be appreciated, both of these are formed by the manufacturer and the gate is normally lapped to provide a good match. Thus, the moldmaker has the much easier task of providing cylindrical opening 86 through the cavity plate rather than forming a tapered gate of a particular size to match a particular valve pin.

In use, the moldmaker machines the nose portions 84 of the nozzles and the tip ends 34 of the valve pins 30 to provide gates of a particular size, and the system is assembled as shown in FIG. 1. The cylindrical opening 86 in the cavity plate 12 is made to receive the nose portion 84 of the nozzle 10 when it is cool so that it expands to provide a tight press fit when the nozzle is heated to operating temperature. The amount of heat in the gate area may also be increased by the moldmaker reducing the length of contact H between the cooled cavity plate 12 and the nose portion 84 of the heated nozzle 10. This will depend upon the material to be molded; for instance H might be about 2 mm for nylon and about 4 mm for PVC or ABS. It is, of course, necessary that the insulation bushing 78 be machined to provide for substantial alignment of the forward face 88 of the nose portion 84 with the adjacent cavity face 90 of the cavity plate after heat expansion at operating temperature. Similarly, the height of the locating ring 20 is adjusted to accurately position the manifold 18 against the nozzle 10.

Electrical power is then applied to the terminals 76 of the heating element 24 to heat the nozzle 10 up to operating temperature. Pressurized melt from the molding machine is then introduced into the melt passage 68 and controlled hydraulic pressure is applied to the actuating mechanism according to a predetermined cycle in a conventional manner. After sufficient melt has been injected to fill the cavity 14 and the high injection pressure held for a short period to pack, the hydraulic pressure is applied to reciprocate the valve pin 30 and piston 38 to the closed position in which the valve pin tip end 34 is seated in the gate 36. The melt pressure is then reduced and the position held for a cooling period before the mold is opened for ejection. After the mold is closed again, hydraulic pressure is applied to reciprocate the valve pin 30 to the open position and the high injection pressure is reapplied. The forward face 88 of the nose portion 84 and the adjacent face 90 of the cavity plate 12 form one side of the cavity 14, and therefore it is important that the fit between them be tight to provide the desired temperature in the gate, minimize the witness line on the product, as well as, of course, to avoid leakage.

Figure 3:
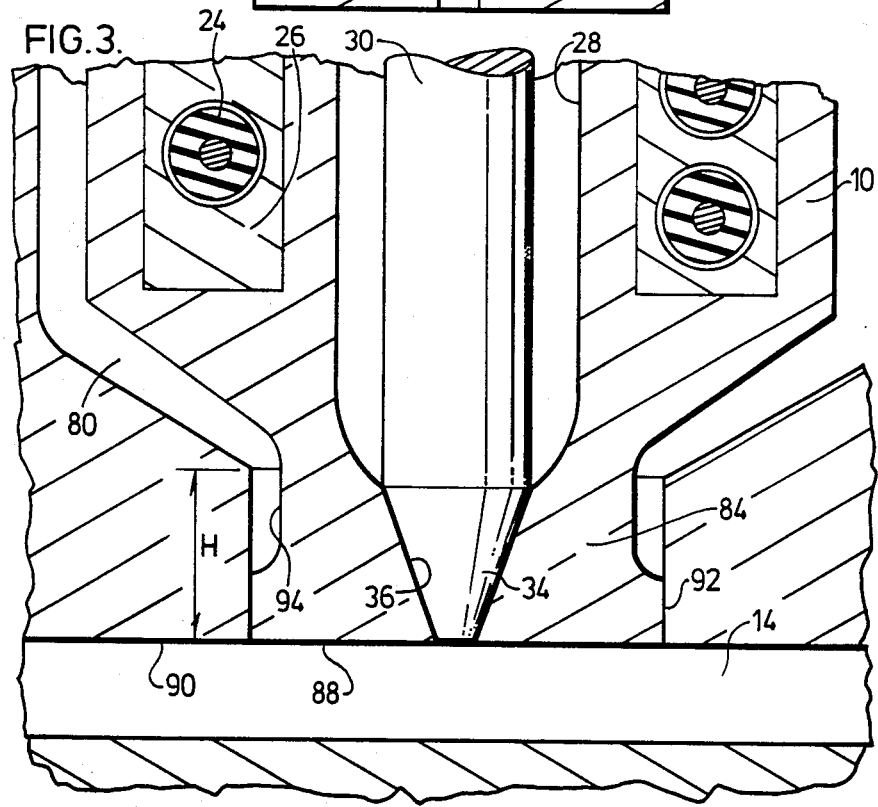
FIG. 3 shows the nose portion of a heated nozzle according to an alternate embodiment of the invention.

Reference is now made to FIG. 3 which shows an alternate embodiment of the invnetion in which the nose portion 84 of the heated nozzle 10 has a somewhat different configuration. In this embodiment, the nose portion 84 is undercut to provide it with a cylindrical shaped head portion 92 extending from a reduced diameter neck portion 94 to the forward face 88. This extends the air space 80 down around the reduced neck portion 94 and reduces heat loss to the cavity plate 12 and also enhance heat transfer to the gate area. Thus, this undercut configuration may be used in addition to or instead of increasing height H for materials where less heat is required or can be tolerated at the forward face 88. Otherwise, the structure and operation of this embodiment of the invention is the same as that described above, and the description need not be repeated.

Although the description of this invention has been given with respect to particular embodiments, it is not to be construed in a limiting sense. Variations and modifications will occur to those skilled in the art. For instance, different types of nozzles and/or actuating mechanisms could be used within the scope of the invention. For a definition of the invention, reference is made to the attached claims.

What I claim is:

1. In a heated nozzle to be seated in a cooled cavity plate in a valve gated injection molding system wherein an elongated valve pin reciprocates in the heated nozzle between open and closed positions, a melt passage extends through a bore in the heated nozzle around the valve pin and conveys hot pressurized melt from a molding machine to a gate leading to a cavity, where said cavity is partially defined on one side by a face of the cavity plate, the valve pin has a driven end and a tip end which seats in the gate in the closed position, and a valve pin actuating mechanism engaging the driven end of the valve pin to drive said valve pin between the open and closed positions, the heated nozzle having a hollow nose portion which defines the gate extending therethrough from the bore to a forward face, the nose portion having a cylindrical outer surface and being tightly seated in a longitudinal position in a cylindrical opening through the cavity plate to the cavity, the nose portion extending through the cylindrical opening to a position wherein at operating temperature the forward face of the nose portion is in substantial alignment with said face of the cavity plate to define said one side of the cavity, the improvement wherein:
   (a) the nose portion is manufactured with the nose portion of the heated nozzle sufficiently longer than the length of the opening through the cavity plate and at least a portion of the gate extending through the nose portion is tapered to decrease in diameter away from the bore,
   (b) the valve pin is manufactured with the tip end being tapered to match the tapered portion of the gate, and
   (c) means are provided to seat the nozzle in the cavity plate whereby the longitudinal position of the nose portion of the nozzle can be adjusted to have the forward face of the nose portion in substantial alignment with said face of the cavity plate,
   whereby a gate having a particular larger diameter can be selected prior to assembly of the system by machining off predetermined forward portions of the nose portion of the nozzle and the matching tapered tip end of the valve pin, and adjusting the seating means to longitudinally locate the nozzle with the forward face of the nose portion in substantial alignment with said face of the cavity plate.

2. A heated nozzle as claimed in claim 1 wherein the nose portion of the heated nozzle is shaped to be inserted into the opening through the cavity plate when cool, whereby thermal expansion of the nose portion as the nozzle is heated tightly engages the nose portion in the cavity plate and prevents leadkage of the pressurized melt between them.

3. A heated nozzle as claimed in claim 2 wherein the nose portion of the heated nozzle and the opening through the cavity plate in which the nose portion is seated are cylindrical shaped.

4. A heated nozzle as claimed in claim 2 wherein the nose portion of the heated nozzle has a cylindrical shaped head portion which extends into the opening through the cavity plate to the forward face from a neck portion having a reduced diameter.

* * * * *